(12) United States Patent
Tanaka et al.

(10) Patent No.: US 8,315,454 B2
(45) Date of Patent: Nov. 20, 2012

(54) ROBOT APPARATUS AND METHOD OF CONTROLLING THE BEHAVIOR THEREOF

(75) Inventors: Fumihide Tanaka, Kanagawa (JP); Hiroaki Ogawa, Chiba (JP); Hirotaka Suzuki, Tokyo (JP); Osamu Hanagata, Tokyo (JP); Tsutomu Sawada, Tokyo (JP); Masato Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 1427 days.

(21) Appl. No.: 11/224,154

(22) Filed: Sep. 12, 2005

(65) Prior Publication Data
US 2006/0056678 A1    Mar. 16, 2006

(30) Foreign Application Priority Data
Sep. 14, 2004    (JP) .................. 2004-267401

(51) Int. Cl.
*G06F 19/00*    (2006.01)
*G05B 19/04*    (2006.01)
(52) U.S. Cl. ........ 382/153; 382/103; 382/107; 700/245; 700/250; 706/62; 706/42
(58) Field of Classification Search ............ 318/568.12, 318/567; 382/103, 106, 107, 153; 250/221; 700/245, 250, 257; 701/28, 23; 114/82, 114/83; 901/47; 446/82, 83; 706/62, 45, 706/47, 52
See application file for complete search history.

(56) References Cited

U.S. PATENT DOCUMENTS
6,347,261 B1 * 2/2002 Sakaue et al. ................. 700/245
(Continued)

FOREIGN PATENT DOCUMENTS
EP    1 074 352    2/2001
(Continued)

OTHER PUBLICATIONS

M. Ito, J. Tani: "On-line imitative interaction with a humanoid robot using a dynamic neural network model of a mirror system" Adaptive Behavior, vol. 12, No. 2, Jun. 1, 2004, pp. 93-115, XP008099382 Retrieved from the Internet: URL:http://dx.doi.org/10.1177/105971230401200202>.

(Continued)

*Primary Examiner* — Ronnie Mancho
(74) *Attorney, Agent, or Firm* — Frommer Lawrence & Haug LLP; William S. Frommer; Thomas F. Presson

(57) ABSTRACT

The present invention provides a robot apparatus that can perform appropriate actions in accordance with the ambient conditions, and a method of controlling the behavior of the robot apparatus. The robot apparatus includes a data-acquiring unit that acquires data, externally and/or internally, a subject-identifying unit that identifies a subject performing an action, by using the data externally acquired, a condition-recognizing unit that recognizes external conditions and/or internal conditions, by using the data externally acquired and/or the data internally acquired, an action-pattern acquiring unit that acquires an action pattern of the subject, by using the data externally acquired, a storage unit that stores action data representing the action of the subject, in association with condition data and subject identification data, the condition data representing conditions external and/or internal of the robot apparatus, and the subject identification data identifying the subject, and an action-performing unit that performs actions, wherein the action-performing unit performs an action represented by the action data stored in the storage unit, in accordance with the identification data and the external and/or internal condition data, when the subject-identifying unit identifies the subject.

9 Claims, 6 Drawing Sheets

U.S. PATENT DOCUMENTS

| | | | |
|---|---|---|---|
| 6,381,515 B1 * | 4/2002 | Inoue et al. | 700/245 |
| 6,551,165 B2 * | 4/2003 | Smirnov | 446/175 |
| 6,714,840 B2 * | 3/2004 | Sakaue et al. | 700/245 |
| 6,967,455 B2 * | 11/2005 | Nakadai et al. | 318/568.12 |
| 7,180,050 B2 * | 2/2007 | Imagawa et al. | 250/221 |
| 7,278,501 B2 * | 10/2007 | Mori et al. | 180/8.5 |
| 7,515,992 B2 * | 4/2009 | Sawada et al. | 700/245 |
| 7,532,743 B2 * | 5/2009 | Morisada | 382/103 |

FOREIGN PATENT DOCUMENTS

| | | |
|---|---|---|
| JP | 2001 246580 | 9/2001 |
| JP | 2003 39362 | 2/2003 |
| JP | 2004 66367 | 3/2004 |
| JP | 2004 90109 | 3/2004 |
| JP | 2005 103679 | 4/2005 |
| WO | WO 02 099545 | 12/2002 |

OTHER PUBLICATIONS

F. Tanaka, H. Suzuki: "Dance interaction with QRIO: a case study for non-boring interaction by using an entrainment ensemble model" Proceedings of the 13$^{th}$ IEEE International Workshop on Robot and Human Interactive Communication (Roman '04), Sep. 20-22, 2004 pp. 419-424, XP010755402 ISBN: 978-0-7803-8570-2 Retrived from the Internet: URL:http://dx.doi.org/10.1109/ROMAN.2004.1374797>.

A. Alissandrakis, C. L. Nehaniv, K. Dautenhahn: "Towards robot cultures?" Interaction Studies, vol. 5, No. 1, May 12, 2004, pp. 3-44, XP002507630 Retrived from the Internet: URL:http://www.benjamins.com/jbp/series/IS/5-1/art/ali .pdf>.

T. Fong, I. Nourbakhsh, K. Dautenhahn: "A survey of socially interactive robots: concepts, design, and applications" Technical Report of the Robotics Institute of Carnegie Mellon University (CMU-RI-TR), No. 02-29, Nov. 2002, XP002507624 Retrieved from the Internet: URL:http://www.ri.cmu.edu/pub_files/pub3/fong_terrence_w_2002_3/fong_terrence_w_2002_3.pd>.

Christopher Lee et al., "Online, Interactive Learning of Gestures for Human/Robot Interfaces" Apr. 1996, pp. 2982-2987.

* cited by examiner

ROBOT APPARATUS AND METHOD OF CONTROLLING THE BEHAVIOR THEREOF

CROSS REFERENCES TO RELATED APPLICATIONS

The present invention contains subject matter related to Japanese Patent Application JP 2004-267401 filed in the Japanese Patent Office on Sep. 14, 2004, the entire contents of which being incorporated herein by reference.

BACKGROUND OF THE INVENTION

1. Field of the Invention

The present invention relates to a robot apparatus that imitates the actions of, for example, man, learns the behavior pattern of man and performs the actions in accordance with the behavior pattern. The invention relates also to a method of controlling the behavior of the robot apparatus.

2. Description of the Related Art

Robot apparatuses hitherto developed can imitate the actions of a subject, by virtue of recognition technology that uses data input from sensors. Imitation, or a monkey-see, monkey-do action, is regarded as the basis of learning a behavior pattern and the basis of achieving communication. In view of this, researches have been conducted to give robot apparatuses an ability of imitating the actions of a subject (e.g., man) in order to achieve smooth communication and interaction between the robot apparatus and the actions of a subject. (See Christopher Lee, Yangsheng Xu, *Online, Interactive Learning of Gestures for Human/Robot Interfaces*, 1996 IEEE International Conference on Robotics and Automation, Vol. 4, pp. 2982-2987; Gordon Cheng, Akihiko Nagakubo and Yasuo Kuniyoshi, *Continuous Humanoid Interaction: An Integrated Perspective Gaining Adaptivity, Redundancy, Flexibility—In One Robotics and Autonomous Systems*, Vol. 37, No. 2-3, pp. 161-183, November 2001; and Tetsuhari Inamura, Iwaki Toshima, Yoshihiko Nakamura, *Acquisition of Humanoid Behavior and Creation of Primitive Symbols, Based on Mimesis*, 16th Annual Conference of Japanese Society for Artificial Intelligence, 2002, Proc. No. 1D1-02.)

These techniques enable robot apparatuses to store action patterns if they act, imitating the subject. If the action patterns are stored, each with an action ID assigned to it, they can be readily read, and the robots can perform the actions.

SUMMARY OF THE INVENTION

However, nobody has ever suggested when the robot apparatus perform actions it has learned and in what condition it does.

The present invention has been made in consideration of the foregoing. It is desirable to provide a robot apparatus that can perform appropriate actions in accordance with the ambient conditions, and also a method of controlling the robot apparatus.

To achieve the object mentioned above, a robot apparatus according to this invention includes: a data-acquiring means for acquiring data, externally and/or internally; a subject-identifying means for identifying a subject performing an action, by using the data externally acquired; a condition-recognizing means for recognizing external conditions and/or internal conditions, by using the data externally acquired and/or the data internally acquired; an action-pattern acquiring means for acquiring an action pattern of the subject, by using the data externally acquired; a storage means for storing action data representing the action of the subject, in association with condition data and subject identification data, the condition data representing conditions external and/or internal of the robot apparatus, and the subject identification data identifying the subject; and an action-performing means for performing actions. The action-performing means performs an action represented by the action data stored in the storage means, in accordance with the identification data and the external and/or internal condition data, when the subject-identifying means identifies the subject.

A method of controlling a robot apparatus, according to this invention includes: a step of acquiring data, externally and/or internally of the robot apparatus; a step of identifying a subject performing an action, by using the data externally acquired; a step of recognizing external conditions and/or internal conditions, by using the data externally acquired and/or the data internally acquired; a step of acquiring an action pattern of the subject, by using the data externally acquired; a step of storing, in the storage means, action data representing the action of the subject, in association with condition data and subject identification data, the condition data representing conditions external and/or internal of the robot apparatus, and the subject identification data identifying the subject; and a step of performing actions represented by the action data stored in the storage means, when the subject is identified, in accordance with the identification data of the subject and the conditions external and/or internal of the robot apparatus.

In the robot apparatus and the method of controlling the behavior thereof, both according to the present invention, data representing the actions of a subject is stored in association with the conditions both internal and external of the subject and the robot apparatus. The robot apparatus identifies the subject on the basis of the data, and performs the same actions in a specific internal or external condition as the subject would do in that specific condition. Thus, the subject can feel that the robot apparatus is more friendly than otherwise.

DETAILED DESCRIPTION OF THE PREFERRED EMBODIMENTS

An embodiment of the present invention will be described, with reference to the accompanying drawings. The embodiment is a two-legged, walking robot apparatus that learns the actions of a subject by imitating the actions. It is a practically useful robot that supports and assists man in his living environment and his daily life. It is also an entertainment robot that can perform the basic actions of man. The configuration of this robot apparatus will be first described, and a method of controlling the actions of the robot apparatus will then be explained in detail.

(1) Configuration of the Robot Apparatus

Figure 1:
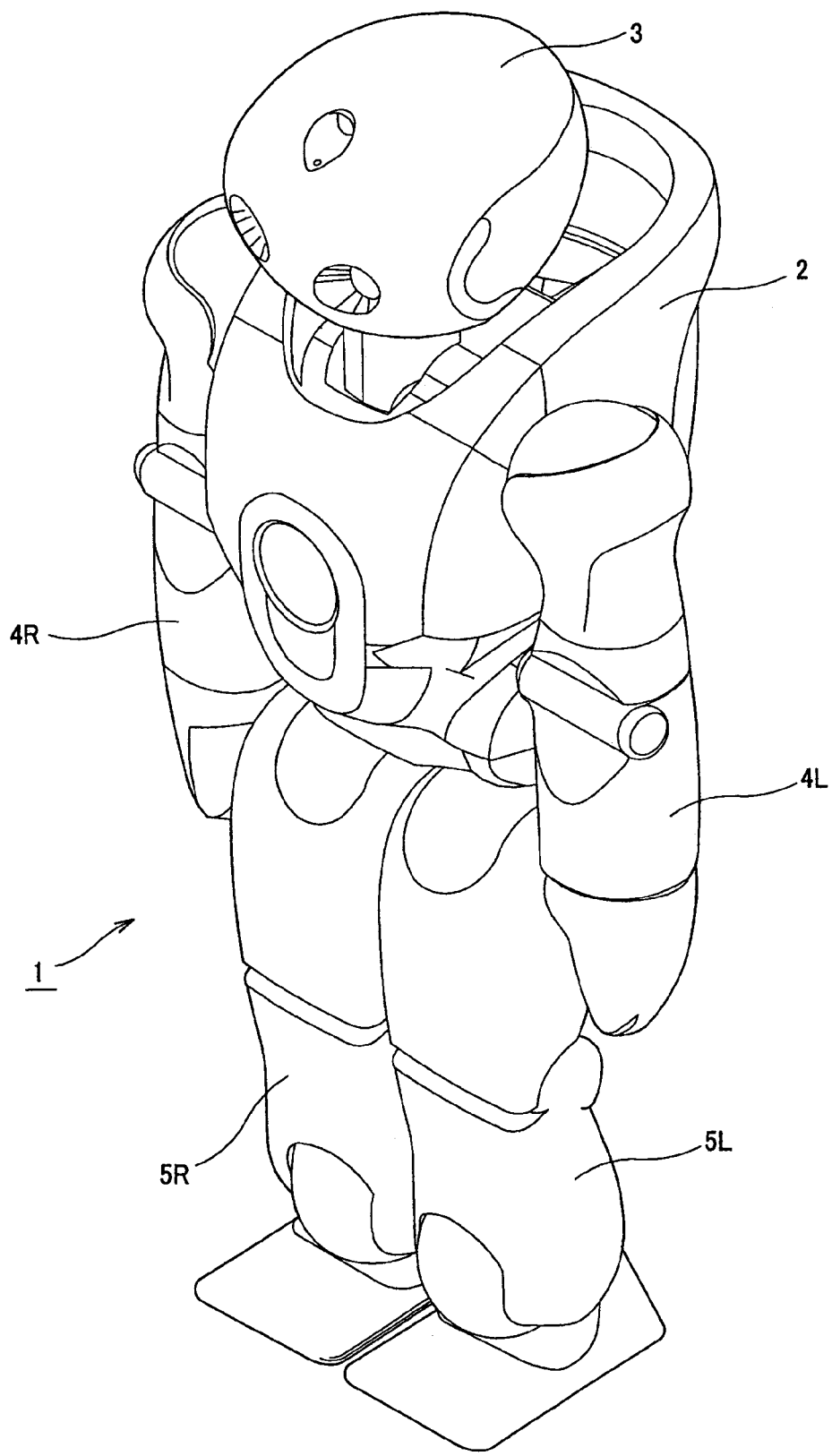
FIG. 1 is a perspective view illustrating the outer appearance of a robot apparatus according to an embodiment of this invention.

First, the configuration of the robot apparatus will be described. As FIG. 1 shows, the robot apparatus 1 according to this embodiment has a trunk unit 2, a head unit 3, two arm units 4L and 4R, two leg units 5L and 5R. The head unit 3, both arm units 4L and 4R and both leg units 5L and SR are connected to the trunk unit 2. (In FIG. 1 and some other figures, "L" denotes the left, and "R" the right.)

Figure 2:
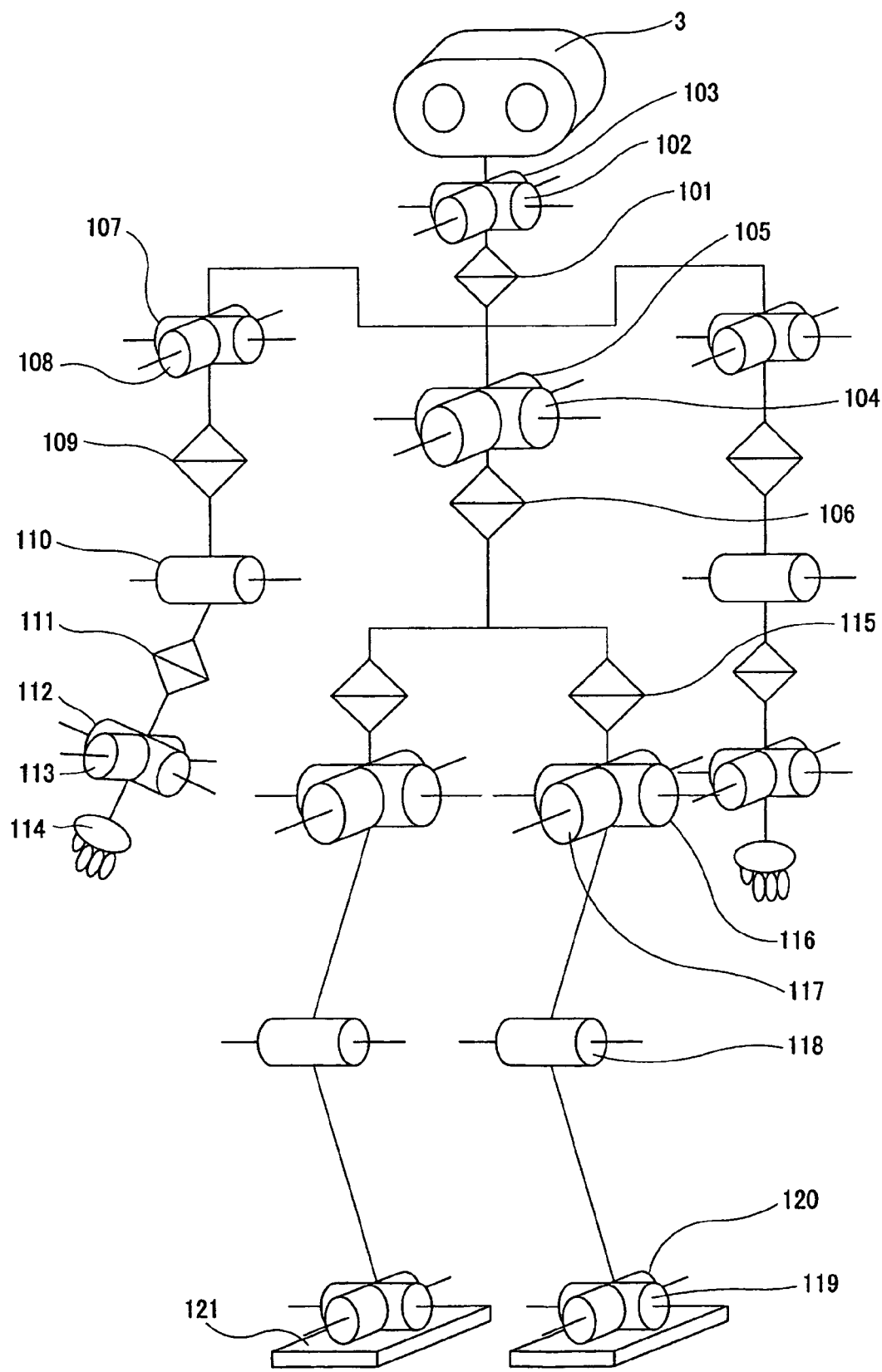
FIG. 2 is a block diagram schematically representing the functions the robot apparatus performs.

The robot apparatus 1 has several degrees of freedom concerning its joints, which is schematically illustrated in FIG. 2. The neck joint that supports the head unit 3 has three degrees of freedom. As FIG. 2 shows, the three degrees of freedom is achieved by a neck-joint yaw axis 101, a neck joint pitch axis 102, and a neckjoint roll axis 103.

Each of the arm units 4L and 4R, which constitute the upper limbs, is composed of a shoulder-joint pitch axis 107, a shoulder-joint roll axis 108, an upper-arm yaw axis 109, an elbow-joint pitch axis 110, a forearm yaw axis 111, a wrist-joint pitch axis 112, a wrist-joint roll axis 113, and a hand part 114. The hand part 114 is, in practice, a multijoint, multi-freedom-degree structure. Nonetheless, the motion of the hand part 114 is considered to have zero degree of freedom here. This is because it little contributes to the control of the position or walking of the robot apparatus 1. Hence, the arm units 4L and 4R have seven degrees of freedom, each.

The trunk unit 2 has three degrees of freedom, which is attained by a trunk pitch axis 104, a trunk roll axis 105, and a trunk yaw axis 106.

Each of the leg units 5L and 5R, which constitute the lower limbs, comprises a hip-joint yaw axis 115, a hip-joint pitch axis 116, a hip-joint role axis 117, a knee-joint pitch axis 118, an ankle-joint pitch axis 119, an ankle-joint roll axis 120, and a foot part 121. In this specification, the intersection between the hip-joint pitch axis 116 and the hip-joint role axis 117 defines the position of the hip joint of the robot apparatus 1. Man's foot is a structure that has many joints and, hence, many degrees of freedom. Nevertheless, either foot part 121 of the robot apparatus 1 is assumed to have zero-degree of freedom. Thus, the leg units 5L and 5R has six degrees of freedom.

In summary, the robot apparatus 1 has 32 degrees of freedom (=3+7×2+3+6×2) in all. Nonetheless, the robot apparatus 1, which is an entertainment robot, is not limited to one that has 32 degrees of freedom. Needless to say, the apparatus 1 may have more or less degrees of freedom, depending on the conditions restricting the design and manufacture or on the specification requirements.

Each degree of freedom that the robot apparatus 1 has is implemented by one actuator. It is desired that the actuator be small and light. The robot apparatus 1 would otherwise fail to meet the demand that it should look like man, not having conspicuous swellings, and should be so controlled in position to walk, though it is a two-legged, unstable structure.

Figure 3:
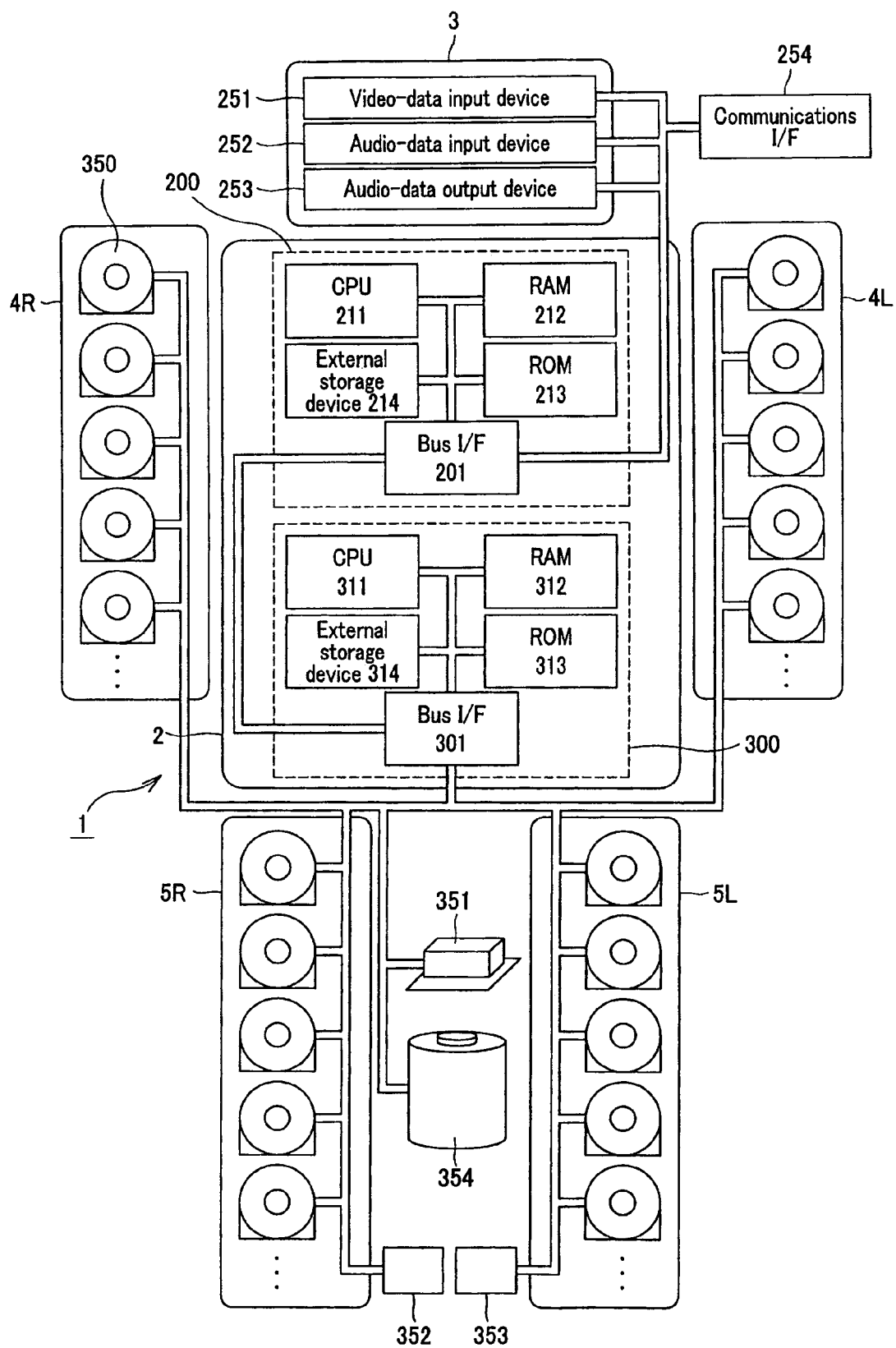
FIG. 3 is block diagram showing, in detail, the control unit that is incorporated in the robot apparatus.

FIG. 3 is a schematic representation of the control system configuration of the robot apparatus 1. As FIG. 3 shows, the control system includes a thought control module 200 and a motion control module 300. The thought control module 200 dynamically responds to the inputs the user has made. From the inputs and the like, the module 200 determines the emotion that the apparatus 1 should express and makes the apparatus 1 express that emotion. The motion control module 300 controls the actuators 350 and the like, which cooperate to move various body parts of the robot apparatus 1.

The thought control module 200 comprises a central processing unit (CPU) 211, a random access memory (RAM) 212, a read only memory (ROM) 213, and an external storage device (e.g., hard disc drive) 214. The module 200 is an independently driven, data-processing device that can process data by itself. The CPU 211 performs operations in response to the user inputs and the like, to determine the emotion the apparatus 1 should express and make the apparatus 1 express this emotion.

The thought control module 200 receives video data from the video-data input device 251 and audio data from the audio-data input device 252. From these external stimuli, the module 200 determines the emotion and will that the robot apparatus 1 should show. The video-data input device 251 has two charge-coupled device (CCD) cameras, i.e., the left-side camera and the right-side camera. The audio-data input device 252 has, for example, a plurality of microphones. The thought control module 200 can output voice through the audio output device 253 having a speaker.

The thought control module 200 issues instructions to the motion control module 300 in order to perform a motion sequence or an action sequence, that is, to move the limbs of the robot apparatus 1 on the basis of the will determined.

The motion control module 300 includes a CPU 311, a RAM 312, a ROM 313, and an external storage device (e.g., hard disc drive) 314. The module 300 is an independently driven, data-processing device that can process data by itself. As indicated above, the CPU 311 controls the coordinate movement of the robot apparatus 1. The external storage device 314 can store, for example, a walking pattern and a target ZMP track, both calculated in off-line mode, and some other behavior program items. ZMP is a point on the floor, at which the moment is zero, which results from a reaction force the apparatus 1 receives from the floor while walking. The ZMP track is the locus that the ZMP defines as the robot apparatus 1 walks. How the ZMP and the ZMP track are applied to determine the stability of walking robots is described in Miomir Vukobratovic, *Legged Locomotion Robots* (translated by Ichiro Katoh, et al., *Walking Robots and Artificial Legs*, Nikkan Kogyo Shimbun, Ltd.).

The motion control module 300 incorporates a bus interface (I/F) 301. The bus interface 301 connects various devices, such as the actuators 350, position sensor 351, floor-touch sensors 352 and 353 and power-supply control device 354. Note that the actuators 350 realize the degrees of freedom of the joints that the robot apparatus 1 has as illustrated in FIG. 2. The position sensor 351 detects the position and inclination of the trunk unit 2. The floor-touch sensors 352 and 353 detect that the left and right feet of the robot apparatus 1 touch or leave the floor. The power-supply control device 354 controls the power supply such as batteries. The position sensor 351 is, for example, a combination of an acceleration sensor and a gyro sensor. The floor-touch sensors 352 and 353 are proximity sensors or micro-switches.

The thought control module 200 and motion control module 300 are provided on the same platform. Bus interfaces 201 and 202 connect the modules 200 and 300.

The motion control module 300 controls the actuators 350 so that the parts of body of the apparatus 1 may move in concert. More precisely, the CPU 311 acquires the action pattern selected by the thought control module 200, from the external storage device 314, or internally generates an action pattern. In accordance with the action pattern, the CPU 311 sets a foot motion, a ZMP track, a trunk motion, an upper-limb motion, a hip horizontal position, a hip height, and the like. The CPU 311 then transfers command values to the actuators 350. The command values control the actuators 350, whereby the robot apparatus 1 performs an action in accordance with the data items the CPU 311 has set.

The CPU 311 detects the position and inclination of the trunk unit 2 of the robot apparatus 1, from the signal output by the position sensor 351. The CPU 311 determines whether the leg units 5L and SR are off or on the floor, from the signals output by the floor-touch sensors 352 and 353. Thus, the CPU 311 can achieve adaptive control, making the parts of body of the robot apparatus 1 move in concert.

Further, the CPU 311 controls the position and action of the robot apparatus 1 in such a way that the ZMP keeps approaching the center of a ZMP stability region.

The motion control module 300 supplies the thought control module 200 with data showing how faithfully the robot apparatus 1 has acted as instructed by the thought control module 200. In other words, the motion control module 300 informs the thought control module 200 of the results it has achieved.

Thus, the robot apparatus 1 can determine both the internal conditions and the external conditions based on the control program, and can perform autonomous actions.

(2) Behavior Control Method of the Robot Apparatus

Figure 4:
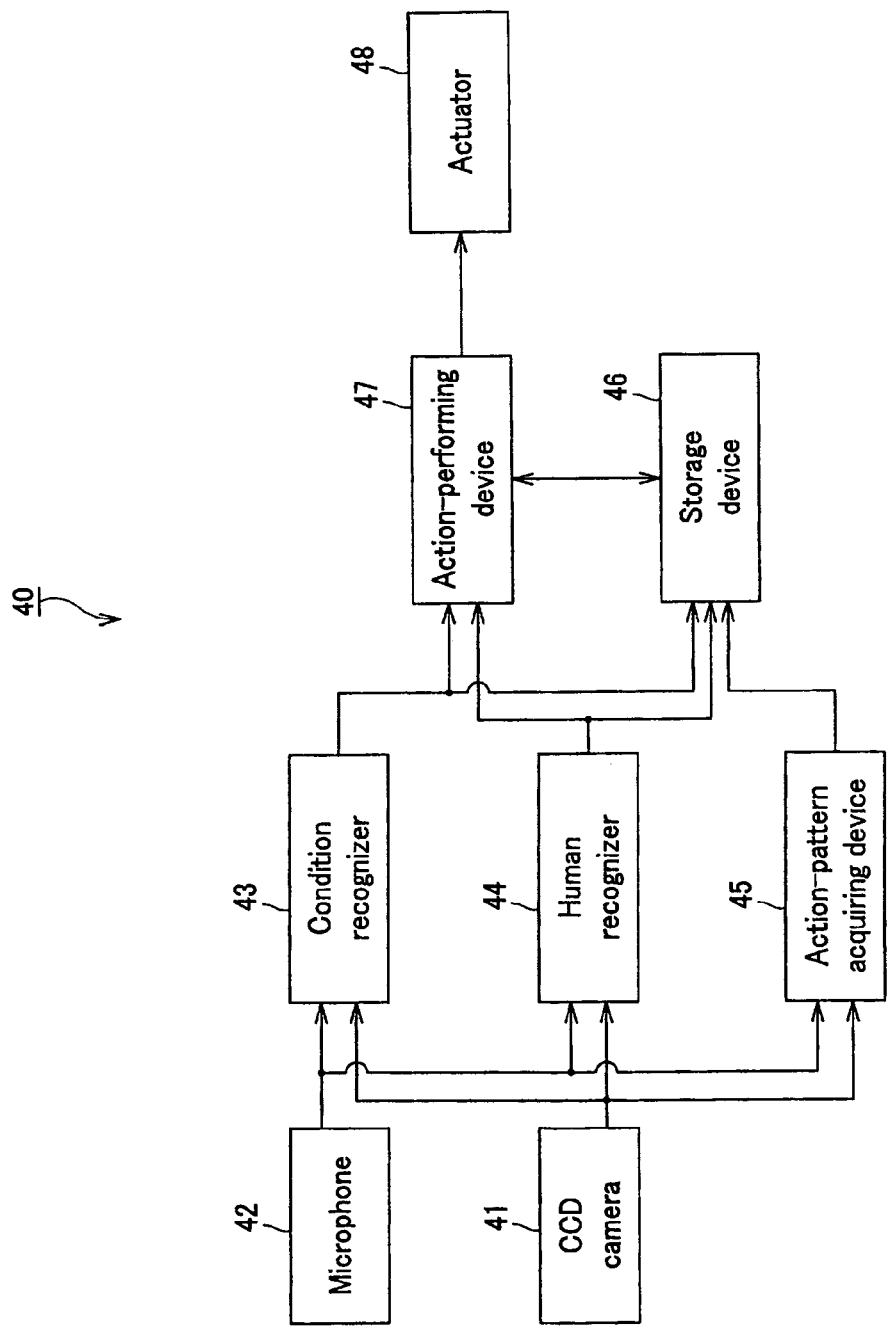
FIG. 4 is a block diagram of the behavior control system the robot apparatus has.

A method of controlling the behavior of the robot apparatus 1 will be explained. FIG. 4 is a block diagram depicting the action control system 40 that the robot apparatus 1 has. The behavior control system 40 comprises a CCD camera 41, a microphone 42, a condition recognizer 43, a human recognizer 44, an action-pattern acquiring device 45, a storage device 46, an action-performing device 47, and an actuator 48. The CCD camera 41 is equivalent to the video-data input device 251 shown in FIG. 3, and the microphone 42 to the audio-data input device 252. The condition recognizer 43 recognizes the conditions ambient to the robot apparatus 1. The human recognizer 44 recognizes a subject, i.e., a man. The action-pattern acquiring device 45 acquires an action pattern as the robot apparatus 1 imitates an action the man performs. The storage device 46 stores the acquired action data, the identification data about the subject, and the condition data, in association. The action-performing device 47 performs an action represented by action data stored in the storage device 46 in accordance with the identification data of the subject and the condition data. The actuator 48 is controlled by the action-performing device 47.

The condition recognizer 43 recognizes the conditions ambient to the robot apparatus 1 from the outputs of the CCD camera 41 and microphone 42. It generates condition data representing the conditions it has recognized. The condition data includes the identification data of objects such as desks, chairs, and the video data and audio data about anything existing around the robot apparatus 1. It also includes data showing the remaining power of the battery provided in the robot apparatus 1 and other data such as a set of vectors pertaining to joint angle.

The human recognizer 44 recognizes the subject (man) by face recognition and voice recognition by using sensors such as the CCD camera 41 and microphone 42. On recognizing the man, the human recognizer 44 generates the ID data of the man.

As mentioned above, the action-pattern acquiring device 45 acquires an action pattern as the robot apparatus 1 imitates an action the man performs. The action pattern acquired is used to make the robot apparatus 1 perform the action. The device 45 maps action patterns acquired in such a way as disclosed in the non-patent documents identified above, and then assigns action IDs to action data items, respectively. The action data items, each assigned with an action ID, are output to the storage device 46.

The storage device 46 receives the action data items from the action-pattern acquiring device 45. It stores each action data item in association with the condition data item and human ID data item obtained when the action data item is acquired. The action data item is associated with the human ID data item, in accordance with, for example, the rule base that holds the relation between action IDs and human IDs.

The action-performing device 47 receives condition data from the condition recognizer 43 and human ID from the human recognizer 44. It reads the action ID related the condition data and human ID from the storage device 46. It then controls the actuator 48 in accordance with the action data assigned with the action ID.

Figure 5:
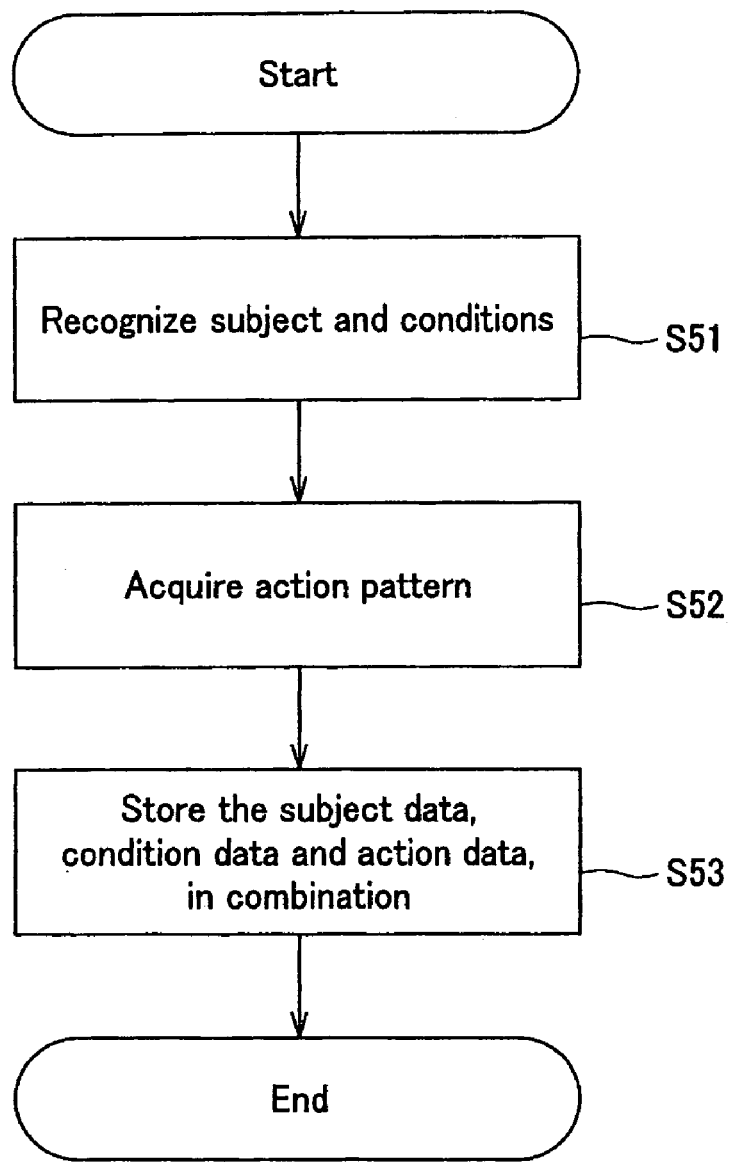
FIG. 5 is a flowchart explaining memory mechanism of the behavior control system.
Figure 6:
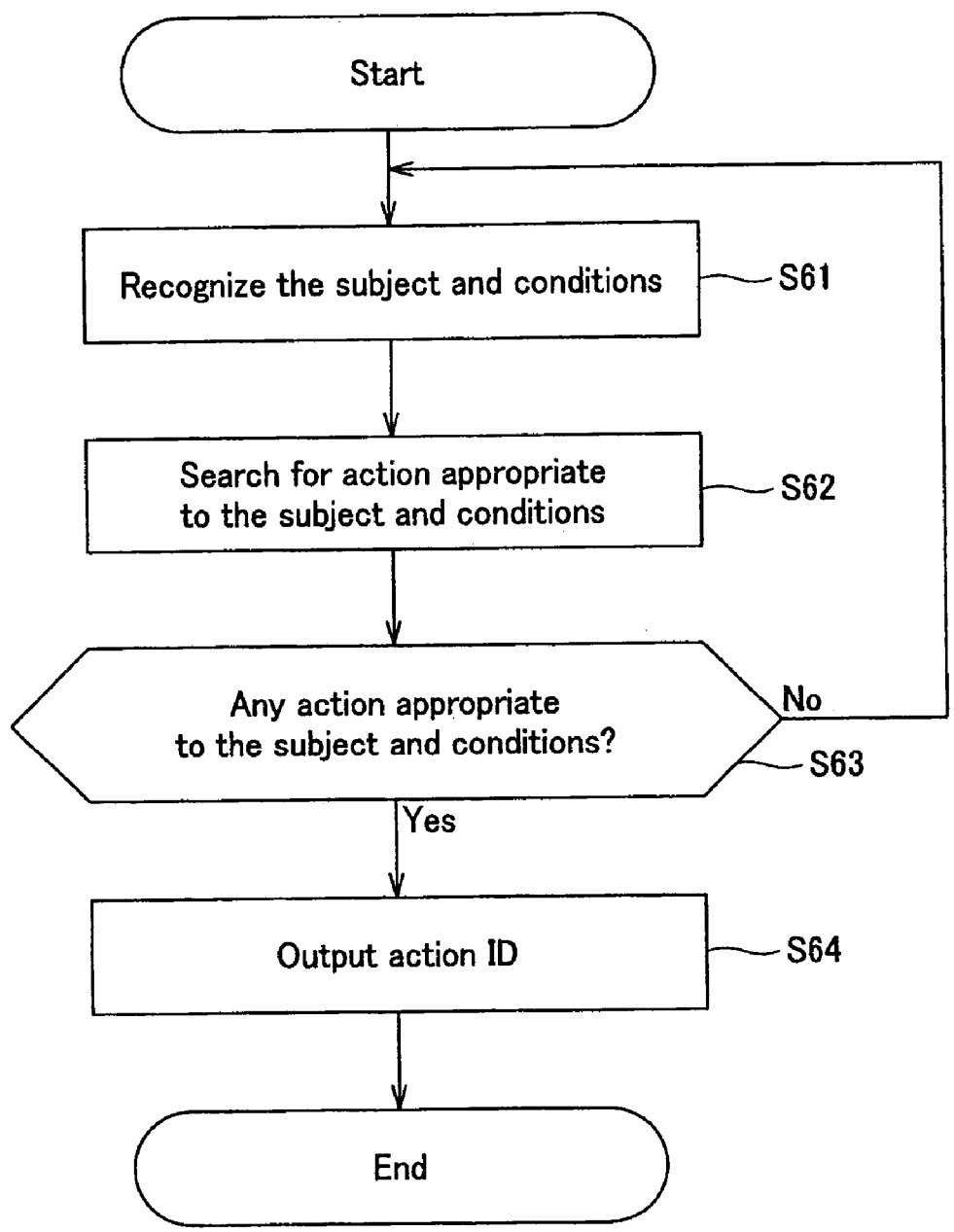
FIG. 6 is a flowchart explaining how the behavior control system makes the robot apparatus perform an action.

How the behavior control system 40 controls the behavior of the robot apparatus 1 will be explained, with reference to the flowcharts of FIGS. 5 and 6. FIG. 5 is a flowchart explaining how the behavior control system 40 stores data. FIG. 6 is a flowchart explaining how the system 40 makes the robot apparatus perform an action.

First, it will be described how the behavior control system 40 stores data. A man may perform an action in front of the CCD camera 41 of the robot apparatus 1. In this case, the human recognizer 44 identifies the man, and the condition recognizer 43 recognizes the conditions in which the man performs the action (Step S51). The condition recognizer 43 recognizes, for example, the objects that exist around the man while the man is performing the action by using the CCD camera 41, microphone 42 and the like.

While the condition recognizer 43 is recognizing the conditions, the action-pattern acquiring device 45 acquires an action pattern of the man, as the robot apparatus 1 imitates the action the man is performing (Step S52). The action of the man is recorded as long as the image of the man stays in the image photographed by the CCD camera 41. Either the man or the operator can designate the time at which the device 45 starts acquiring the action pattern and the time at which the device 45 finishes acquiring the action pattern. The action-pattern acquiring device 45 starts acquiring the pattern when the man, for example, says, "Start acquiring the action pattern," and stops acquiring the pattern when the man says, "Stop acquiring the action pattern." The device 45 thus acquires the action pattern. The device 45 may acquire the pattern as the operator makes the same oral instructions. Still alternatively, the device 45 may start or stop acquiring the pattern when the acceleration with which the hands or feet of the man move exceeds, in absolute value, a predetermined threshold value.

When the image of the man no longer stays in the image photographed by the CCD camera 41, the storage device 46 stores the action data about the man which has been output from the action-pattern acquiring device 45. More correctly, the storage device 46 stores the action data in association with the data representing the condition at a given point and with the human ID of the man (Step S53).

Suppose that Mr. A waves the right hand before his face upon seeing green pepper, because he habitually do so when he sees anything he does not like. Then, the human recognizer 44 generates the human ID of Mr. A from the image of Mr. A's face and the voice Mr. A utters. Meanwhile, the condition recognizer 43 generates the object ID of the green pepper upon identifying the mage of the green pepper with an image already stored. Further, the action-pattern acquiring device 45 generates an action ID on acquiring Mr. A's action pattern of waving his right hand before his face. The human ID of Mr. A, the object ID of the green pepper as condition data and the action ID of the right-hand waving are stored in combination.

How the behavior control system 40 makes the robot apparatus 1 to perform an action will be explained. Assume that the image of the man appears in the image photographed by the CCD camera 41 of the robot apparatus 1. Then, the human recognizer 44 recognizes the man, and the condition recognizer 43 recognizes the present conditions ambient to the man (Step S61). The condition recognizer 43 recognizes the conditions from, for example, the images of some objects existing around the man and provided by the CCD camera 41 and the sound made by these objects and detected by the microphone 42.

The action-performing device 47 receives condition data from the condition recognizer 43 and human ID from the human recognizer 44. In accordance with the condition data and human ID, the device 47 searches the storage device 46 for the action that the man has performed (Step S62). That is, the action is searched for, on the basis of the human ID of the man and the data representing the conditions in which the man has performed the action.

It is determined whether the storage device 46 stores an action ID that corresponds to the condition data and human ID (Step S63). If NO in Step S63, the operation returns to Step S61, in which the condition recognizer 43 recognizes the present conditions. If the rule base in the storage device 46 contains the action ID corresponding to the condition data and the human ID, the action-performing device 47 outputs the action ID (Step S64). The device 47 controls the actuator 48 in accordance with the action data corresponding to the action ID. As a result, the robot apparatus 1 performs the action, imitating the man.

Assume that, as described above, Mr. A waves the right hand before his face upon seeing green pepper, because he habitually do so when he sees anything he does not like. Then, the condition recognizer 43 and the human recognizer 44 output the object ID of green pepper and the human ID of Mr. A to the action-performing device 47. The action-performing device 47 outputs the action ID of the right-hand waving, which is simply associated with the object ID of green pepper and the human ID of Mr. A. Thus, the device 47 acquires the action data identified with the action ID, from the storage device 46.

As indicated above, the action data showing an action of a subject and the condition data representing the conditions in which the subject performs the action are stored in association, in the robot apparatus and method of controlling the apparatus, both according to the present invention. Hence, the robot apparatus 1 can act, imitating the subject, when the robot apparatus faces the same conditions. Since the robot apparatus 1 stores the action data and the condition data in association, it has the same habits as the subject. The robot apparatus 1 appears friendly to the subject.

In this embodiment, the condition data is external data such as object ID. Instead, the condition data may be internal data, such as the remaining power in the battery or a set of vectors pertaining to joint angle. If this is the case, the robot apparatus 1 can perform more complex actions.

The condition data may be live video data representing, for example, the background. In this case, a histogram of image colors is first obtained and values for individual components of the histogram are compiled into a vector.

The rule base in the storage device 46 may be updated. All data items, except identifiers such as human ID, change from time to time. In view of this, the average of each data item may be calculated every time the rule base is updated.

To output an action ID, the human ID and data items, which associate with the action ID, need not agree to one another. It suffices to find a humming distance between the vector stored in the storage device and the vector at the present moment in consideration of the vector consisting of all elements, and to change the probability of outputting an action.

Moreover, general rules may be extracted from the condition data items and the action data items stored in the storage device 46. Suppose Mr. A, Mr. B and Mr. C may habitually waves the right hand before the face, whenever they see green pepper. Then, the robot apparatus may be programmed to wave the right hand before its face, when it sees a green pepper, no matter whether the subject is Mr. A, Mr. B or Mr. C.

The present embodiment uses a rule base that holds each action ID in association with the corresponding condition data. Instead, the action ID and the condition data may be coupled in a neural network. In a hierarchical neural network, the human ID and the condition data may be input to the input layer, and the action ID may be output from the output layer.

The robot apparatus according to the embodiment described above acts, imitating a man, in accordance with the pattern acquired by the action-pattern acquiring device 45. Nevertheless, the robot apparatus can acquire action patterns from animals, such as dogs and cats, or from other robot apparatuses, and can acts, imitating the animals or the other robot apparatuses.

It should be understood by those skilled in the art that various modifications, combinations, sub-combinations and alternations may occur depending on design requirements and other factors insofar as they are within the scope of the appended claims or the equivalents thereof.

What is claimed is:

1. A robot apparatus comprising:
   data-acquiring means for acquiring data, externally and/or internally;
   subject-identifying means for identifying a subject performing an action, by using the data externally acquired;
   condition-recognizing means for recognizing external conditions and/or internal conditions, by using the data externally acquired and/or the data internally acquired;
   action-pattern acquiring means for acquiring an action pattern of the subject, by using the data externally acquired;
   storage means for storing action data representing the action of the subject, in association with condition data and subject identification data, the condition data representing conditions external and/or internal of the robot apparatus, and the subject identification data identifying the subject; and
   action-performing means for searching the storage means to select an action based on at least a remaining power of a power source of the robot apparatus and joint angles of the robot apparatus and performing the action,
   wherein the external conditions and/or internal conditions include live video data background represented by a vector formed by values of individual components of a histogram that is obtained from the live video data,
   wherein the actions performed by the action-performing means imitates a predetermined action of the subject, the predetermined action being habitually performed by the subject under the recognized external conditions; and
   wherein the action-performing means performs an action represented by the action data stored in the storage means, in accordance with the identification data and the external and/or internal condition data, when the subject-identifying means identifies the subject.

2. The robot apparatus according to claim 1, wherein the data-acquiring means has imaging means for picking up an image, and sound-collecting means for collecting sound.

3. The robot apparatus according to claim 2, wherein the action-pattern acquiring means keeps acquiring the action pattern while an image of the subject stays in the image acquired by the data-acquiring means or while being instructed to do so by an oral instruction.

4. The robot apparatus according to claim 1, wherein the storage means records the condition data representing conditions that exist external and/or internal of the robot apparatus at any given time while the subject is performing an action.

5. A method of controlling the behavior of a robot apparatus, comprising steps of:
   acquiring data, externally and/or internally of the robot apparatus;
   identifying a subject performing an action, by using the data externally acquired;
   recognizing external conditions and/or internal conditions, by using the data externally acquired and/or the data internally acquired;
   acquiring an action pattern of the subject, by using the data externally acquired;
   storing, in storage means, action data representing the action of the subject, in association with condition data and subject identification data, the condition data representing conditions external and/or internal of the robot apparatus, and the subject identification data identifying the subject; and
   searching the stored action data to select an action based on at least a remaining power of a power source of the robot apparatus and joint angles of the robot apparatus and performing the action, when the subject is identified, in accordance with the identification data of the subject and the conditions external and/or internal of the robot apparatus,
   wherein the external conditions and/or internal conditions include live video data background represented by a vector formed by values of individual components of a histogram that is obtained from the live video data,
   wherein the actions performed by the performing step imitates a predetermined action of the subject, the predetermined action being habitually performed by the subject under the recognized external conditions.

6. The method of controlling the behavior of a robot apparatus, according to claim 5, wherein the step of acquiring data has a step of picking up an image, and a step of collecting sound.

7. The method of controlling the behavior of a robot apparatus, according to claim 6, wherein, in the step of acquiring an action pattern, the action pattern is continuously acquired while an image of the subject stays in the image acquired by the data acquiring means or while an oral instruction keeps instructing acquisition of the data.

8. The method of controlling the behavior of a robot apparatus, according to claim 5, wherein the condition data representing conditions that exist external and/or internal of the robot apparatus at any given time while the subject is performing an action is stored in the storage means in the step of storing action data.

9. A robot apparatus comprising:
   a data-acquiring unit that acquires data, externally and/or internally;
   a subject-identifying unit that identifies a subject performing an action, by using the data externally acquired;
   a condition-recognizing unit that recognizes external conditions and/or internal conditions, by using the data externally acquired and/or the data internally acquired;
   an action-pattern acquiring unit that acquires an action pattern of the subject, by using the data externally acquired;
   a storage unit that stores action data representing the action of the subject, in association with condition data and subject identification data, the condition data representing conditions external and/or internal of the robot apparatus, and the subject identification data identifying the subject; and
   an action-performing unit that searches the storage unit to select an action based on at least a remaining power of a power source of the robot apparatus and joint angles of the robot apparatus and performs the action,
   wherein the external conditions and/or internal conditions include live video data background represented by a vector formed by values of individual components of a histogram that is obtained from the live video data,
   wherein the actions performed by the action-performing unit imitates a predetermined action of the subject, the predetermined action being habitually performed by the subject under the recognized external conditions; and
   wherein the action-performing unit performs an action represented by the action data stored in the storage unit, in accordance with the identification data and the external and/or internal condition data, when the subject-identifying, unit identifies the subject,
   wherein the data-acquiring unit has an imaging unit that picks up an image, and a sound-collecting unit that collects sound,
   wherein the action-pattern acquiring unit keeps acquiring the action pattern while an image of the subject stays in the image acquired by the data-acquiring unit or while being instructed to do so by an oral instruction, and
   wherein the storage unit records the condition data representing conditions that exist external and/or internal of the robot apparatus at any given time while the subject is performing an action.

* * * * *